(12) United States Patent
Oku

(10) Patent No.: US 9,071,058 B2
(45) Date of Patent: Jun. 30, 2015

(54) CHARGER AND ELECTRONIC APPARATUS SYSTEM

(71) Applicant: Panasonic Corporation, Osaka (JP)

(72) Inventor: Hiroyuki Oku, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 14/176,969

(22) Filed: Feb. 10, 2014

(65) Prior Publication Data

US 2015/0022141 A1 Jan. 22, 2015

(30) Foreign Application Priority Data

Jul. 19, 2013 (JP) ................................. 2013-151015

(51) Int. Cl.
*H02J 7/04* (2006.01)
*H02J 7/16* (2006.01)
*H02J 7/00* (2006.01)

(52) U.S. Cl.
CPC ............... *H02J 7/0029* (2013.01); *H02J 7/007* (2013.01)

(58) Field of Classification Search
USPC .......................................... 320/150, 153–154
See application file for complete search history.

(56) References Cited

U.S. PATENT DOCUMENTS

| 5,519,303 | A | * | 5/1996 | Goedken et al. ............. 320/150 |
| 5,684,663 | A | | 11/1997 | Mitter | |
| 5,767,659 | A | | 6/1998 | Farley | |
| 5,797,717 | A | | 8/1998 | Tanaka et al. | |
| 5,825,155 | A | | 10/1998 | Ito et al. | |
| 6,075,343 | A | * | 6/2000 | Hsu ............................... 320/134 |
| 6,075,346 | A | * | 6/2000 | Kikuchi et al. ............... 320/150 |
| 7,091,697 | B2 | | 8/2006 | Mader et al. | |
| 7,952,330 | B2 | * | 5/2011 | Mori ............................ 320/150 |
| 7,973,513 | B2 | | 7/2011 | Wihlborg et al. | |
| 2004/0027093 | A1 | | 2/2004 | Tashiro et al. | |
| 2005/0058410 | A1 | | 3/2005 | Healy et al. | |
| 2007/0170888 | A1 | | 7/2007 | Hioki | |
| 2009/0072135 | A1 | | 3/2009 | Horikoshi et al. | |

(Continued)

FOREIGN PATENT DOCUMENTS

DE 692 28 918 T2 9/1999
EP 2 694 321 A1 2/2014

(Continued)

OTHER PUBLICATIONS

Search Report dated Apr. 14, 2014, for corresponding GB Patent Application No. 1402460.8, 5 pages.

(Continued)

*Primary Examiner* — Samuel Berhanu
(74) *Attorney, Agent, or Firm* — Seed IP Law Group PLLC

(57) ABSTRACT

A charger capable of charging an electronic apparatus includes a charger main body having a power output unit which output charging power, a connection unit which is attached to the charger main body, which is configured to be connected to the electronic apparatus, and which is configured to supply the charging power from the power output unit to the electronic apparatus in a state that the connection unit is connected to the electronic apparatus, and a temperature sensor which is provided in the connection unit, and which is configured to detect a temperature in the vicinity of the connection unit.

9 Claims, 3 Drawing Sheets

(56) References Cited

U.S. PATENT DOCUMENTS

| | | | |
|---|---|---|---|
| 2009/0195215 A1* | 8/2009 | Sato et al. | 320/150 |
| 2009/0195237 A1 | 8/2009 | Feliss et al. | |
| 2011/0050175 A1 | 3/2011 | Odaohhara et al. | |
| 2012/0206840 A1 | 8/2012 | Goelz et al. | |
| 2012/0235631 A1 | 9/2012 | Nakashima et al. | |
| 2013/0063098 A1 | 3/2013 | Knowlton et al. | |
| 2013/0201316 A1 | 8/2013 | Binder et al. | |
| 2013/0335024 A1 | 12/2013 | Akai et al. | |
| 2014/0049218 A1 | 2/2014 | Morand et al. | |
| 2014/0073189 A1 | 3/2014 | Kondou et al. | |

FOREIGN PATENT DOCUMENTS

| | | |
|---|---|---|
| EP | 2 706 628 A1 | 3/2014 |
| JP | 60-160034 A | 10/1985 |
| JP | 08-308139 A | 11/1996 |
| JP | 2005-294232 A | 10/2005 |
| JP | 2007-195021 A | 8/2007 |
| JP | 2007-325500 A | 12/2007 |
| JP | 2009-106010 A | 5/2009 |
| JP | 2010-268668 A | 11/2010 |
| JP | 2011-054342 A | 3/2011 |
| JP | 2011-114955 A | 6/2011 |
| JP | 2011-139572 A | 7/2011 |
| JP | 2012-147642 A | 8/2012 |
| JP | 2012-196120 A | 10/2012 |
| KR | 10-2012-0006635 A | 1/2012 |
| WO | 2009/040998 A1 | 4/2009 |

OTHER PUBLICATIONS

Johannsen, "Einer für alle: Micro-USB wird Standard für Handy-Ladegeräte," article from German IT website "Netzwelt," (http://www.netzwelt.de/news/79492-micro-usb-standard-handy-ladegeraete.html), dated Feb. 18, 2009 (4 pages).

Search Report dated Apr. 11, 2014, for corresponding GB Patent Application No. 1402617.3, 4 pages.

* cited by examiner

CHARGER AND ELECTRONIC APPARATUS SYSTEM

BACKGROUND

The present disclosure relates to a charger for charging a secondary battery of a portable terminal or the like as well as to an electronic apparatus system including the charger.

Chargers capable of charging an electronic apparatus including portable ones are now available in a variety of shapes. A secondary battery incorporated in an electronic apparatus is charged by connecting a charger to the electronic apparatus. Various proposals have been made to secure the safety during charging (refer to JP-A-8-308139, JP-A-2007-195021, JP-A-2007-325500, for example).

In JP-A-8-308139, a constant current regulation circuit, a constant voltage regulation circuit, a control unit, etc. are provided in a charger. For quick charging of a secondary battery, the danger due to heat generation by the secondary battery is lowered by setting thermal cutoff temperature stages according to the temperature of the secondary battery.

In JP-A-2007-195021, a portable terminal apparatus is equipped with an authentication circuit, a built-in power source for supplying power to the authentication circuit, and a power managing means for shutting off the supply of power from an external power source to the terminal main body and supplying power to the authentication circuit from the built-in power source during authentication of the external power source. The terminal main body can be protected by abstaining from using an external power source to be authenticated, and power consumption of the built-in power source that is used for authentication can be reduced by supplying power from it only during an authentication period.

In JP-A-2007-325500, a power supply device is equipped with a receiving means for receiving internal temperature data of a charging/discharging device, a temperature measuring means for measuring its own internal temperature, and a power supply mode switching means for switching the mode of power supply to the charging/discharging device on the basis of the internal temperature data. A battery pack can be charged in a charging mode that is suitable for a temperature condition by measuring its temperature. This makes it possible to suppress charging capacity reduction due to an overcurrent that occurs when the battery pack is charged in a state that its temperature is out of a proper range.

To secure the safety during charging, proposals have been made in which a threshold value is set in the temperature range of a secondary battery or the like for its charging (refer to JP-A-8-308139, JP-A-2007-195021, JP-A-2007-325500). However, whereas the connection units between chargers and electronic apparatus are being miniaturized, no techniques have been proposed which take into consideration the situation that the danger due to heat generation that is caused by short-circuiting that is induced by dust, water, etc. is increasing.

SUMMARY

The present disclosure has been made in the above circumstances, and an object of the present disclosure is therefore to provide a charger and an electronic apparatus system which can eliminate the risk of short-circuiting etc. in the vicinity of the connection unit between the charger and an electronic apparatus.

The present disclosure provides a charger capable of charging an electronic apparatus, comprising:

a charger main body having a power output unit which outputs charging power;

a connection unit which is attached to the charger main body, which is connectable to the electronic apparatus, and which is configured to supply the charging power from the power output unit to the electronic apparatus in a state that the connection unit is connected to the electronic apparatus; and a temperature sensor which is provided in the connection unit, and which is configured to detect temperature in the vicinity of the connection unit.

For example, the temperature sensor is connected to a positive-side charging path for outputting, to the electronic apparatus, the charging power supplied from the power output unit.

For example, the charger further comprises: an output suspending unit which suspends the output of the charging power from the power output unit if the temperature detected by the temperature sensor is higher than or equal to a prescribed temperature; an output suspension state maintaining unit which maintains an output suspension state of the charging power; and an output suspension state canceling unit which cancels the output suspension state of the charging power due to the output suspension state maintaining unit when receiving a suspension state cancellation signal.

For example, the charger further comprise: an output suspending unit which suspends the output of the charging power from the power output unit if the temperature detected by the temperature sensor is higher than or equal to a prescribed temperature; and an output suspension state maintaining unit which maintains an output suspension state of the charging power, and the output suspension state of the charging power that has been maintained by the output suspension state maintaining unit is canceled, if an external supply of power to the charger main body is stopped in the output suspension state of the charging power.

For example, the charger main body and the connection unit are connected to each other by a charging cable, and information of the temperature detected by the temperature sensor is communicated to the charger main body through a signal line of the charging cable.

For example, the signal line of the charging cable is a line that is dedicated to a notification of the information of the temperature.

The present disclosure provides an electronic apparatus system comprising any of the above chargers and an electronic apparatus.

Since the temperature sensor is provided in the connection unit and the temperature in the vicinity of the connection unit is thereby detected all the time, a temperature increase occurring due to short-circuiting or the like not only in the connection unit itself but also between the connection unit and the electronic apparatus can be detected easily. This makes it possible to perform fail-safe processing on the charger side. The safety of the electrical connection between the connection unit and the terminal apparatus is secured, whereby a charger and an electronic apparatus system that can be used reliably by a user can be provided.

DETAILED DESCRIPTION OF EXEMPLARY EMBODIMENTS

A charger and an electronic apparatus system according to a preferred embodiment of the present disclosure will be hereinafter described in detail with reference to FIGS. 1 to 3.

Figure 1:
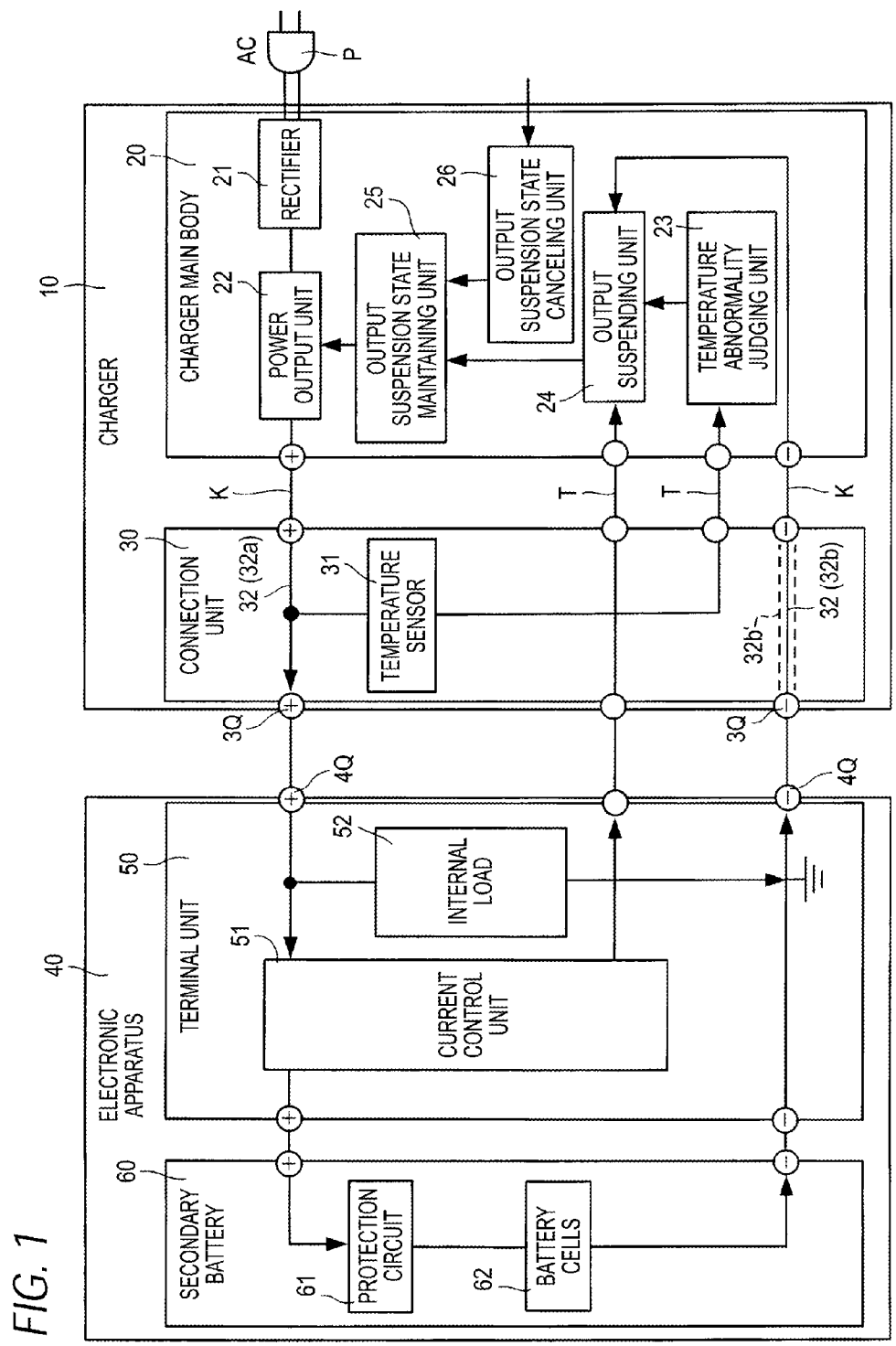
FIG. 1 is a block diagram of an electronic apparatus system and a charger incorporated therein according to an embodiment of the present disclosure.

FIG. 1 is a block diagram of an electronic apparatus system and a charger incorporated therein according to the embodiment of the present disclosure. The electronic apparatus system consists of a charger 10 and an electronic apparatus 40. The charger 10 has a charger main body 20 and a connection unit 30. The electronic apparatus 40 is equipped with a terminal unit 50 and a secondary battery 60.

The charger main body 20 is equipped with a plug P which can be electrically connected to an external commercial AC power line, a rectifier 21, a power output unit 22, a temperature abnormality judging unit 23, an output suspending unit 24, an output suspension state maintaining unit 25, and an output suspension state canceling unit 26. The connection unit 30 is shaped like a connector (e.g., USB (Universal Serial Bus) connector) so as to be electrically connectable to the electronic apparatus 40. The connection unit 30 is equipped with a temperature sensor 31 which is connected to a charging path 32 formed in the connection unit 30. For example, a thermistor can be used as the temperature sensor 31. The connection unit 30 is equipped with plural charging terminals 3Q which are exposed from the connection unit 30 and are to be electrically connected to respective charging terminals 4Q of the electronic apparatus 40 (described later).

The charger main body 20 and the connection unit 30 are electrically connected to each other by a charging cable K, which has signal lines T for communicating temperature detected by the temperature sensor 31 to the charger main body 20. The signal lines T of the charging cable K may be independently provided lines which are dedicated to notification of temperature information and have a different specification than general-purpose signal lines. The charger main body 20 has the rectifier 21 as mentioned above. However, in the case of a portable charger having dry cells B or the like as a power source, the above-mentioned rectifier 21 behaves as a power source.

In the embodiment shown in FIG. 1, the temperature sensor 31 is connected to a positive-side charging path 32a for supplying charging power to the electronic apparatus 40 from the power output unit 22. The path surface area of a negative-side charging path 32b (shown as a negative-side charging path 32b' of the embodiment) is very much larger than that of the positive-side charging path 32a (e.g., by a factor of about 100). Therefore, when some abnormality has occurred, resulting heat may be dissipated quickly on the side of the negative-side charging path 32b, resulting in a slow temperature increase there. Connecting the temperature sensor 31 to the positive-side charging path 32a will enable proper detection of the temperature increase.

The rectifier 21 is an AC/DC converter. The power output unit 22 outputs power that is suitable for the electronic apparatus 40 to be charged using power produced by the rectifier 21 through conversion. The temperature abnormality judging unit 23 judges whether or not a temperature increase detected by the temperature sensor 31 is abnormal, that is, larger than a threshold value. If the temperature abnormality judging unit 23 judges that a temperature detected by the temperature sensor 31 is higher than or equal to a prescribed temperature, the output suspending unit 24 suspends output of charging power from the power output unit 22. The output suspension state maintaining unit 25 maintains an output suspension state of charging power. The output suspension state canceling unit 26 cancels an output suspension state that has been maintained by the output suspension state maintaining unit 25 upon reception of a suspension state cancellation signal.

The electronic apparatus 40 is a cellphone such as a smartphone, an information terminal such as a tablet PC, a portable terminal with a camera, a digital camera, a measuring instrument, or a detector, or the like. The terminal unit 50 of the electronic apparatus 40 is equipped with a current control unit 51 for controlling a charging current, an internal load 52 that occurs in association with operation of various circuits etc. for, for example, controlling the terminal unit 50, and the plural charging terminals 4Q which are exposed from the terminal unit 50.

A secondary battery 60 is charged by power that is supplied from the external charger 10, for example, and causes various units provided in the electronic apparatus 40 to operate on energy stored thereby by charging. The secondary battery 60 is equipped with a protection circuit 61 for protecting the secondary battery 60 from an abnormality such as overcharging that may occur during charging of the secondary battery 60 and battery cells 62 such as a lithium-ion buttery or a nickel-hydrogen battery.

Figure 2A:
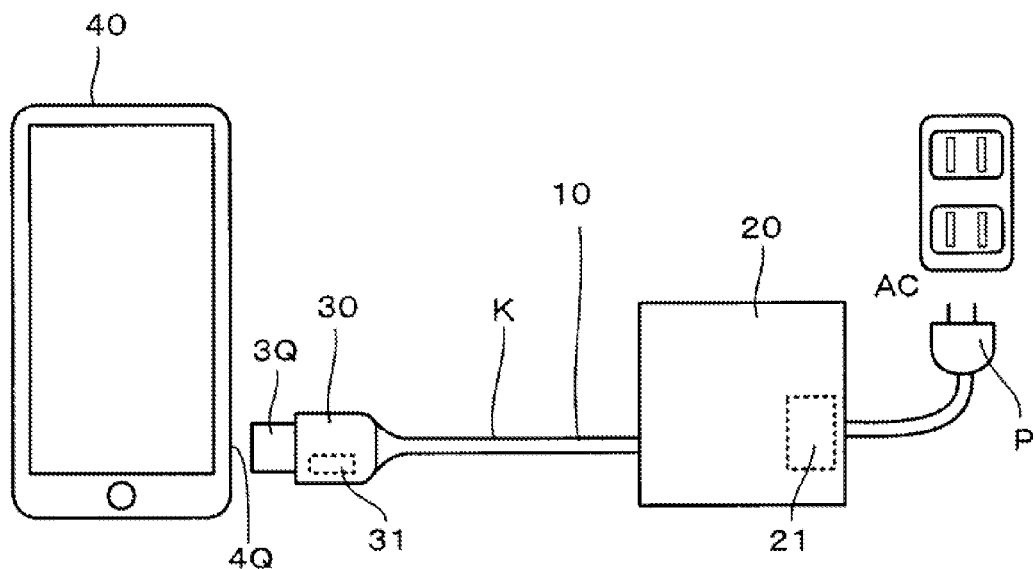
FIGS. 2A and 2B are schematic diagrams of electronic apparatus systems and chargers included therein according to first and second specific embodiments of the present disclosure, respectively.
Figure 2B:
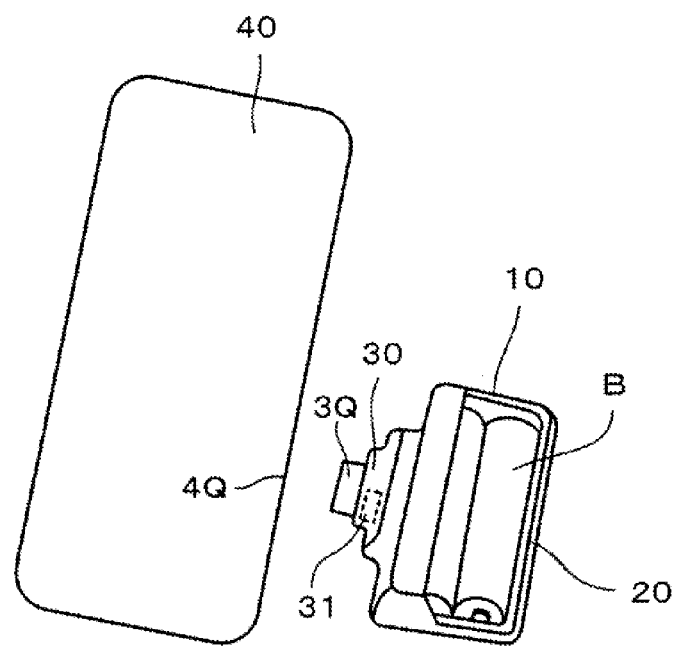

FIGS. 2A and 2B are schematic diagrams of electronic apparatus systems and chargers included therein according to first and second specific embodiments of the present disclosure, respectively.

In the first specific embodiment, the charger 10 is equipped with the plug P and uses an external commercial AC power line as a power source and the charger main body 20 is equipped with the rectifier 21. As shown in FIG. 2A, the temperature sensor 31 is provided in the connection unit 30 which is provided at the tip of the cable K.

The charger 10 according to the second specific embodiment is a portable charger (pocket charger) in which dry cells B or the like are used as a power source. As shown in FIG. 2B, the charger main body 20 and the connection unit 30 are integrated together. And the charging cable K and the signal lines T are integrally provided on the charging path 32 which is implemented together with the circuits.

The chargers 10 according to the first and second specific embodiments are of the insertion type using a USB terminal, for example. The structure for electrical connection between the connection unit 30 and the electronic apparatus 40 is not limited to the ones employed in the specific embodiments, and may be any of other structures such as a convex/concave engagement structure, a connection structure using connection between contacts, and a connection structure using pin fitting.

Figure 3:
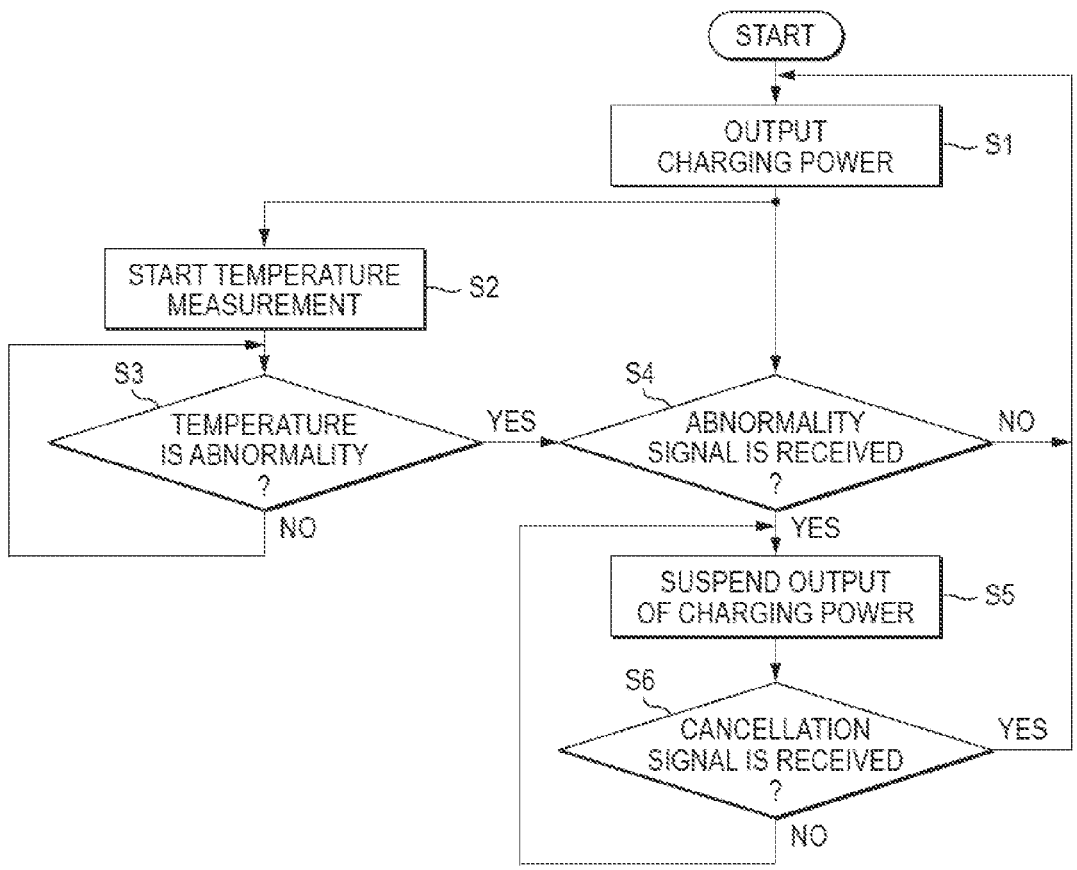
FIG. 3 is a flowchart of an example process which is executed by the charger and the electronic apparatus system according to the embodiment of the present disclosure.

FIG. 3 is a flowchart of an example process which is executed by the charger and the electronic apparatus system according to the embodiment of the present disclosure.

Upon electrical connection between the charger 10 and the electronic apparatus 40, at step S1 the power output unit 22 outputs charging power to charge the secondary battery 60 (quick charging) via the connection unit 30. Upon supply of charging power to the charging path 32, at step S2 the temperature sensor 31 starts measurement of a temperature in the vicinity of the connection unit 30. Temperature information detected by the temperature sensor 31 is transmitted to the temperature abnormality judging unit 23 of the charger main body 20 through the signal lines T of the charging cable K. At step S3, the temperature abnormality judging unit 23 judges whether or not the temperature detected by the temperature sensor 31 is higher than or equal to a prescribed temperature (e.g., 100° C.) on the basis of the received temperature information.

Temperature increase mainly occurs in the charging path 32 when electrical continuity is established the positive side and the negative side of the charging terminals 3Q and 4Q due to dust, water, or the like. Temperature increase may occur only on the charger 10 side or the electronic apparatus 40 side or due to establishment of electrical connection between the charger 10 and the electronic apparatus 40. Since the temperature sensor 31 is provided in the connection unit 30, danger to occur in the charger 10 itself can be detected and heat generation to occur in the charging terminals 4Q, that is, in the electric path on the side of the electronic apparatus 40 can be detected easily.

If the detected temperature increase is higher than or equal to the prescribed temperature (S3: yes), the temperature abnormality judging unit 23 generates an abnormality signal and sends it to the output suspending unit 24.

At step S4, the output suspending unit 24 judges whether it has received an abnormality signal. If receiving an abnormality signal (S4: yes), at step S5 the output suspending unit 24 suspends the output of charging power from the power output unit 22. The output suspending unit 24 sends an abnormality signal to the output suspension state maintaining unit 25, which, in response, maintains the output suspension state of the charging power. If not receiving an abnormality signal (S4: no), the output suspending unit 24 maintains the output of charging power from the power output unit 22. The process thereafter returns to step S1.

Unless a proper measure is taken, supply of charging power from the power output unit 22 may be restarted if short-circuiting is removed and the detected temperature thereby become lower than the prescribed temperature. In contrast, in the embodiment, since the output suspension state is maintained by means of the output suspension state maintaining unit 25, an even dangerous situation such as melting of the connection unit 30 can be avoided. After starting the charging, the user does not watch the charging state. However, since the output suspension state maintaining unit 25 maintains the output suspension state of the charging power in response to the abnormality signal, recurrence of an abnormality state is prevented, whereby a charging environment that is safe for the user can be realized.

At step S6, the output suspension state canceling unit 26 judges whether it has received a suspension state cancellation signal. If receiving a suspension state cancellation signal which is a cancellation command generated upon a push of a reset button or the like by the user (S6: yes), the output suspension state canceling unit 26 cancels the output suspension state that has been maintained by the output suspension state maintaining unit 25. The process thereafter returns to step S1. If the output suspension state canceling unit 26 has not received a suspension state cancellation signal (S6: no), the process returns to step S5 to maintain the output suspension state.

In the above-describe process, the output suspension state being maintained by the output suspension state maintaining unit 25 is canceled upon reception of a cancellation state cancellation signal. However, an output suspension state may be canceled by shutoff of power to the charger main body 20, which occurs when the user has pulled out the plug P from the socket and then inserted the former into the latter or has removed the dry cells B or the like. When the user pulls out the plug P from the socket, the supply of power to the charger 10 is stopped, as a result of which, for example, the holding state of a latch circuit capable of preventing repetition of restart of a suspension state of the output suspension state maintaining unit 25 can no longer maintained. The output suspension state is thus canceled.

The charging terminals 3Q of the connection unit 30 and the charging terminals 4Q of the electronic apparatus 40 are exposed. Therefore, the connection unit 30 may be connected to the electronic apparatus 40 in a state that dust, water droplets, or the like is attached to the charging terminals 3Q or 4Q, possibly resulting in short-circuiting or a like dangerous event. Since the temperature sensor 31 is provided in the connection unit 30 and the temperature in the vicinity of the connection unit 30 is thereby detected all the time, a temperature increase due to short-circuiting or the like occurring not only between the charging terminals 3Q but also between the charging terminals 3Q and the charging terminals 4Q can be detected easily. This makes it possible to perform fail-safe processing. Furthermore, since temperature information can be communicated directly from the connection unit 30 to the charger main body 20 without intervention of the electronic apparatus 40, fail-safe processing can be started quickly.

The present disclosure is not limited the above embodiment, and various modifications, improvements, etc. can be made as appropriate. And the material, shape, dimensions, related numerical values, form of implementation, number (where plural ones are provided), location, etc. of each constituent element of the embodiment are optional and are not restricted as long as the present disclosure can be implemented.

The present disclosure can be applied for the purpose of preventing danger due to heat generation that is caused by short-circuiting or the like in the vicinity of the connection unit of a charger in charging the secondary battery of an electronic apparatus which is a cellphone such as a smartphone, an information terminal such as a tablet PC, a portable terminal with a camera, a digital camera, a measuring instrument, or a detector, or the like.

The present application is based on Japanese Patent Application No. 2013-151015 filed on Jul. 19, 2013, the contents of which are incorporated herein by reference.

The invention claimed is:

1. A charger capable of charging an electronic apparatus through a Universal Serial Bus, comprising:
 a charger main body having a power output unit which outputs charging power and a control unit which controls the power output unit;
 a positive-side charging path and a negative-side charging path for outputting, to the electronic apparatus, the charging power supplied from the power output unit;
 a connection unit which is coupled to the charger main body, which is connectable to the electronic apparatus, and which contains a part of the positive-side charging path and a part of the negative-side charging path respectively extended from the charger main body;
 at least one signal line which is extended from the charger main body, and which is arranged between the part of the positive-side charging path and the part of the negative-side charging path in at least the connection unit; and
 a temperature sensor which is provided in the vicinity of the part of the positive-side charging path in the connection unit, and which is configured to detect temperature information, a distance between a center of the temperature sensor and the part of the positive-side charging path in the connection unit being smaller than a distance between the center of the temperature sensor and the part of the negative-side charging path in the connection unit, a path surface area of the part of the positive-side charging path in the connection unit being smaller than a path surface area of the part of the negative-side charging path in the connection unit, wherein the control unit is capable of receiving the temperature information from the temperature sensor through the at least one signal line regardless of presence or absence of the connection to the electronic apparatus, and stops the output of the charging power from the power output unit if temperature detected by the temperature sensor is higher than or equal to a prescribed temperature.

2. The charger according to claim 1, wherein the charger main body includes:
an output suspension state maintaining unit which maintains an output suspension state of the charging power; and
an output suspension state canceling unit which cancels the output suspension state of the charging power due to the output suspension state maintaining unit when receiving a suspension state cancellation signal.

3. The charger according to claim 2, wherein the output suspension state of the charging power that has been maintained by the output suspension state maintaining unit is canceled, if an external supply of power to the charger main body is stopped in the output suspension state of the charging power.

4. The charger according to claim 1, wherein the at least one signal line is an exclusive line for communicating the temperature information of the temperature sensor.

5. An electronic apparatus system comprising:
the charger according to claim 1; and
an electronic apparatus.

6. The charger according to claim 1, wherein the temperature sensor is connected to the positive-side charging path.

7. The charger according to claim 6, wherein the temperature sensor is in contact with the positive-side charging path.

8. The charger according to claim 1, wherein the charger main body is housed in a first housing and the connection unit is housed in a second housing,
the first housing and the second housing are connected to each other by a cable.

9. The charger according to claim 8, wherein the cable includes the positive-side charging path, the negative-side charging path, and the at least one signal line which is dedicated to notification of temperature information.

* * * * *